Figure 1:
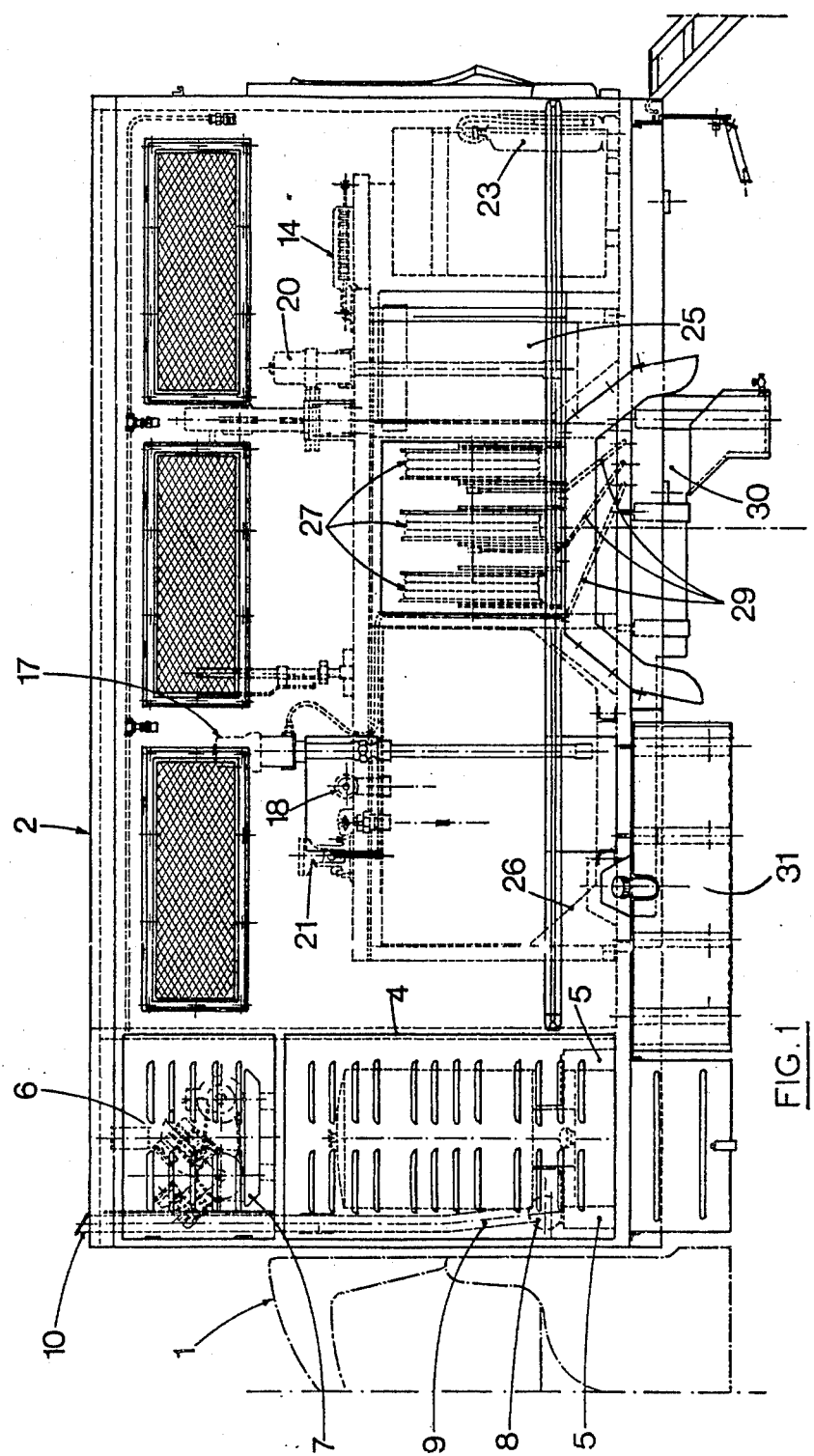

United States Patent [19]

Legueu

[11] 4,230,358
[45] Oct. 28, 1980

[54] HIGHLY AUTONOMOUS CROSS-COUNTRY WORKSHOP AND SERVICING VAN

[76] Inventor: Paul E. R. Legueu, 85 Av. de Mazy, 44380 Pornichet, France

[21] Appl. No.: 923,893

[22] Filed: Jul. 12, 1978

[30] Foreign Application Priority Data

Jan. 11, 1978 [FR] France ................. 78 00640

[51] Int. Cl.$^3$ ............................................. B60P 3/14
[52] U.S. Cl. ............................. 296/24 R; 180/89.11
[58] Field of Search ........................... 296/1 R, 24 R; 180/89.1, 89.11, 89.12, 68.5

[56] References Cited

U.S. PATENT DOCUMENTS

| | | | |
|---|---|---|---|
| 1,886,782 | 11/1932 | Bentz | 296/24R |
| 2,365,940 | 12/1944 | Couse | 296/24 R |
| 3,000,665 | 9/1961 | Reeves | 296/24 R |
| 3,633,970 | 1/1972 | Langhals | 296/24 R |
| 4,133,572 | 1/1979 | Robbins | 296/24 R |

*Primary Examiner*—Robert R. Song
*Attorney, Agent, or Firm*—Kenyon & Kenyon

[57] ABSTRACT

The workshop and servicing van is adapted to be included in an autonomous motorized unit travelling in desert regions or regions little equipped with fixed stations for servicing and repairing automobile vehicles. The van comprises an electric generating set interposed between the driving cab and the front end side of the body of the vehicle. The generating set supplies power to servicing and repairing equipment fixed inside the body. The front side of the body has openings for the passage of energy transfer lines and pipes.

8 Claims, 2 Drawing Figures

HIGHLY AUTONOMOUS CROSS-COUNTRY WORKSHOP AND SERVICING VAN

The invention relates to a highly autonomous so-called cross-country workshop and servicing van intended to be included in an autonomous motorized unit travelling in desert regions or regions little equipped with fixed stations for servicing and repairing automobile vehicles.

The motorized companies for transporting persons and in particular troops usually comprise transport vehicles proper, medical vehicles (ambulances), supply vehicles (mobile) and equipment vehicles, this unit being capable of satisfying all its needs and existing in a completely autonomous manner. However, it is desirable to add to these units breakdown and servicing vans for maintaining the vehicles of the unit in perfect condition so as to avoid any incident which might adversely affect the progression of said units.

The invention consequently relates to such a van having the feature that the source of energy for supplying power to the equipments contained therein leaves the inside volume of the body of the vehicle completely free without, however, unbalancing the van and, on the contrary, resulting in an advantageous distribution of the loads.

According to the invention, there is provided a highly autonomous workshop and servicing van adapted to travel in regions devoid of servicing and breakdown stations for automobile vehicles, said van comprising a driving cab and a body connected by a supporting chassis, wherein there is provided an electric generating set which is disposed between the cab and the front side of the body, said set acting as a source of energy for the servicing and breakdown equipment fixed inside the body, said front side having orifices for the passage of energy transfer lines and pipes.

According to a preferred embodiment, the generating set is removably mounted on skis fixed by bolts and nuts, this set being capable of being used on the ground in an autonomous manner.

According to a feature of the invention, an air compressor is removably fixed above the generating set and is also disposed between the driving cab and the front side of the body of the van.

Figure 2:
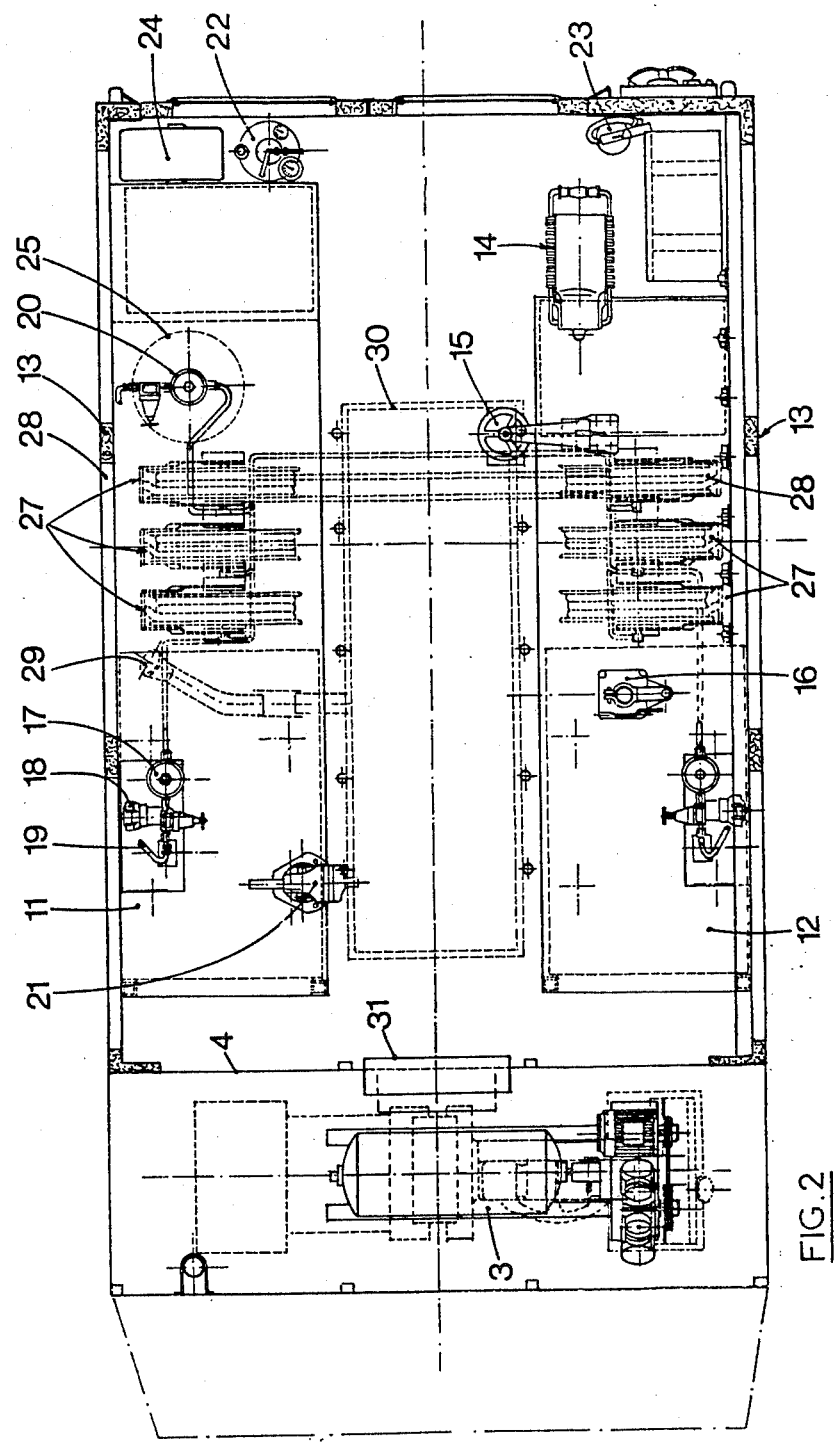

A workshop and servicing van according to the invention is shown by way of a non-limitative embodiment in the accompanying drawings in which:

FIG. 1 is a side elevational view of the van, and
FIG. 2 is a top plan view of the van shown in FIG. 1.

The essential object of the invention is to render available the users of a breakdown and servicing vehicle included in a company of vehicles intended to travel in desert regions or in any case in regions which have not been supplied with service and maintenance stations, said vehicle having the feature of being highly autonomous and consequently having a large range of action (1,600 km).

The van according to the invention comprises a driving cab 1 partly shown in dot-dash lines and a body 2 supported by the same chassis or by two independent chassis.

According to the invention, the van comprises an electric generating set 3 having the feature of being interposed between the driving cab 1 and the front end side 4 of the body, the position of this generating set allowing a good distribution of the loads and consequently a good attitude of the vehicle.

This generating set is removably mounted on skis 5 by detachable fixing means, such as nuts and bolts, so as to be capable of being fixed to the skis or placed on the ground for supplying in an autonomous manner the electric current for the apparatus or for the lighting of a camp.

This generating set, when it is fixed on the van, supplies current to the servicing or breakdown equipment inside the body 2 the volume of which is fully available owing to the fact that the generating set is located outside the body. For this purpose, the front end side 4 of the body is provided with openings for the passage of lines or pipes connecting the servicing and breakdown items of equipment to the generating set.

In order to have also available a pneumatic power, the van also comprises an air compressor 6 which in the presently-described embodiment is removably fixed above the generating set by a support 7 and detachable fixing means such as nuts and bolts.

This air compressor is also interposed between the driving cab 1 and the front end side of the body 2 so as to distribute the loads and avoid reducing the inside volume of the body.

The generating set has an exhaust with a silencer 8 connected to the exterior by an exhaust pipe 9, this exhaust pipe terminating in an outlet pipe 10 which projects from the body.

The servicing equipment comprises two benches 11 and 12 parallel to the lateral walls 13 of the body and carrying in particular a press for the scraping of tire inner tubes 14, a vulcanizer 15 for repairing the inner tubes, a driller support 16, an oil pump 17, an oil filling pipe 18 and a cistern level 19.

These benches also carry a grease pump 20 and one or more vices 21. The body is also provided with a brake bleeder 22, a fire extinguisher 23, a jerrican 24 containing brake oil, a grease tank 25 and an oil cistern 26 located under the bench and filling the space under the latter.

As shown in the accompanying drawings, the body is also provided with two sets of three reels of hose with a gun 27 located under each bench 11 and 12. These reels of hose are located in front of openings 28 formed in the lateral walls 13 of the body so that the flexible hose 29 wound on these reels can be freely unwound outside the body for lubricating the differential axles and the gearboxes of the vehicles to be serviced or repaired.

The body is provided with a pipe 29 for filling a drinking water tank 30, the tank being of large capacity (200 liters) and located under the floor of the body and provided laterally with two fuel tanks 31 of a capacity for allowing the vehicle to travel over long distances, for example 1,600 km.

All these servicing and breakdown means are supplied with electric current by the generating set 3 and with compressed air by the compressor 6. For this purpose, the front end side 4 of the body is provided with openings for the passage of connecting conductor lines and pipes and the flexible hoses 28 of the reels are respectively connected to the grease or oil tanks. In order to facilitate the handling of the electric apparatus, electric sockets supplying 6, 12 and 24 volts may be provided inside the body so that the apparatus may be connected in a simple manner, the voltage and the amperage of the generating set being read off from a control panel 31 inserted in the front end wall 4 of the body and visible from inside the latter.

The breakdown equipment comprises the aforementioned items of equipment to which there may be added an electric driller, a welding station, a grinding wheel, a battery charger and any other item required for the immediate mechanical repairing of a broken-down vehicle.

This vehicle has the feature of including, in itself, all the means for servicing or repairing vehicles which form a motorized company travelling in regions which are little or insufficiently equipped with service stations, this vehicle in association with medical vehicles and troop-transporting vehicles and mobile supply vehicles constituting an autonomous unit capable of staying for a long time in desert regions remote from built-up regions or towns.

It must be understood that the invention is not intended to be limited to the embodiment described hereinbefore and illustrated in the accompanying drawings, since other forms and embodiments of the invention may be envisaged without departing from the scope of the invention defined in the accompanying claims.

I claim:

1. A highly autonomous cross-country workshop and servicing van intended to travel in regions devoid of service and repairing stations for automobile vehicles, said van comprising:
    (a) chassis means;
    (b) a driving cab and body mounted upon and interconnected by said chassis, said body comprising a front end wall adjacent said cab but spaced therefrom and having passage openings formed therein;
    (c) an electric generating set removably mounted on said vehicle between said cab and said front wall by means of skis, releasable fixing means connecting said skis to said generating set, said set being thereby capable of being used on the ground in an autonomous manner;
    (d) equipment fixed inside said body; and
    (e) power transfer lines and pipes connecting said generating set to said equipment, said power transfer lines and pipes passing through said passage openings in said front end wall.

2. A van as claimed in claim 1, wherein an air compressor is removably fixed above the generating set and is also interposed between the driving cab and the front end side of the body of the van.

3. A van as claimed in claim 1, wherein the vehicle comprises lateral walls having openings and said equipment comprises at least one reel of hose with a gun placed in front of the openings formed in the lateral walls of the vehicle, a brake bleeder, a press for scraping tire inner tubes, a vulcanizer, a battery charger and benches.

4. A van as claimed in claim 1, wherein the repairing equipment comprises a driller, a grinding wheel, benches, vices, a welding station and a battery charger supplied with power by the generating set.

5. A highly autonomous cross-country workshop and servicing van intended to travel in regions devoid of service and repairing stations for automobile vehicles, said van comprising:
    (a) chassis means;
    (b) a driving cab and body interconnected by said chassis means, said body comprising a front end wall having passage openings therein, adjacent to and spaced from said cab, and lateral walls having openings therein;
    (c) an electric generating set interposed between said cab and said front end wall;
    (d) equipment fixed inside said body comprising at least one reel of hose with a gun, disposed in front of an opening in said lateral walls, a brake bleeder, a press for scrapping tire inner tubes, a vulcanizier, a battery charger and two benches symmetrically disposed alongside the lateral walls of said body, said benches having disposed thereon a vise and driller support, a grease tank and a oil cistern being disposed under said benches, and pumps coupling said grease tank and oil cistern to said hose; and
    (e) power transfer lines and pipes connecting said generating set to said equipment and supplying power to said vise and driller support.

6. A van as claimed in claim 5, wherein the repairing equipment comprises a driller, a grinding wheel, benches, vises, a welding station and a battery charger supplied with power by the generating set.

7. A highly autonomous cross-country workshop and servicing van intended to travel in regions devoid of service and repairing stations for automobile vehicles, said van comprising:
    (a) chassis means;
    (b) a driving cab and body interconnected by said chassis means, said body comprising a front end wall having passage openings therein, adjacent to and spaced from said cab, and lateral walls having openings therein;
    (c) an electric generating set interposed between said cab and said front end wall;
    (d) equipment fixed inside body comprising two reels of hose provided with guns disposed opposite openings in said lateral walls, a brake bleeder, a press for scrapping tire inner tubes; a vulcanizer, a battery charger, at least one bench, a grease tank and oil cistern being disposed under said at least one bench, said two reels of hoses disposed between said grease tank and oil cistern, and pump means coupling said grease tank and oil cistern to said reels of hoses to permit servicing the differential axles and gear boxes of vehicles to be serviced or repaired; and
    (e) power transfer lines and pipes connecting said generating set to said equipment and supplying power to said equipment.

8. A van as claimed in claim 7, wherein the repairing equipment comprises a driller, a grinding wheel, benches, vises, a welding station and a battery charger supplied with power by the generating set.

* * * * *